United States Patent
Yoo et al.

(10) Patent No.: US 11,629,389 B2
(45) Date of Patent: Apr. 18, 2023

(54) STEEL MATERIAL FOR TAYLOR WELDED BLANK AND METHOD FOR MANUFACTURING HOT-STAMPED PART USING SAME STEEL

(71) Applicant: Hyundai Steel Company, Incheon (KR)

(72) Inventors: Byung Gil Yoo, Seoul (KR); Hyeong Hyeop Do, Chungcheongnam-do (KR); Chee Woong Song, Seoul (KR); Do Hak Kim, Gyeongsangbuk-do (KR); Young Mun Shin, Chungcheongnam-do (KR); Soon Geun Jang, Sejong (KR); Sang Mun Hong, Gyeongsangbuk-do (KR)

(73) Assignee: Hyundai Steel Company, Incheon (KR)

( * ) Notice: Subject to any disclaimer, the term of this patent is extended or adjusted under 35 U.S.C. 154(b) by 208 days.

(21) Appl. No.: 16/625,431

(22) PCT Filed: Dec. 29, 2017

(86) PCT No.: PCT/KR2017/015716
§ 371 (c)(1),
(2) Date: Dec. 20, 2019

(87) PCT Pub. No.: WO2019/004541
PCT Pub. Date: Jan. 3, 2019

(65) Prior Publication Data
US 2021/0292866 A1 Sep. 23, 2021

(30) Foreign Application Priority Data

Jun. 27, 2017 (KR) .................. 10-2017-0081280
Dec. 8, 2017 (KR) .................. 10-2017-0168403

(51) Int. Cl.
*C21D 9/50* (2006.01)
*B21D 22/02* (2006.01)
(Continued)

(52) U.S. Cl.
CPC ............. *C21D 9/50* (2013.01); *B21D 22/022* (2013.01); *C21D 6/005* (2013.01); *C21D 8/0205* (2013.01);
(Continued)

(58) Field of Classification Search
CPC ........ C21D 9/50; C21D 6/005; C21D 8/0205; C21D 8/0226; C21D 8/0236;
(Continued)

(56) References Cited

U.S. PATENT DOCUMENTS

2015/0361532 A1* 12/2015 Nam .................. C22C 38/00
420/106

FOREIGN PATENT DOCUMENTS

CN 104838030 A 8/2015
KR 10-1318060 B1 10/2013
(Continued)

OTHER PUBLICATIONS

KIPO machine translation of KR-20140141218 (Year: 2021).*

*Primary Examiner* — Anthony J Zimmer
*Assistant Examiner* — Ricardo D Morales
(74) *Attorney, Agent, or Firm* — Fox Rothschild LLP

(57) ABSTRACT

In accordance with one aspect of the present disclosure, there is provided a steel material for a tailor-welded blank, including 0.04 to 0.06 wt % of carbon (C), 1.2 to 1.5 wt % of manganese (Mn), 0.01 to 0.10 wt % of titanium (Ti), 0.01 to 0.10 wt % of niobium (Nb), and the balance of iron (Fe) and inevitable impurities; having a tensile strength (TS) of 550 MPa or greater, a yield strength (YS) of 300 MPa or
(Continued)

greater, and an elongation (EL) of 20% or greater; and having a dual-phase structure of ferrite and martensite.

3 Claims, 10 Drawing Sheets

(51) Int. Cl.
    *C21D 6/00*     (2006.01)
    *C21D 8/02*     (2006.01)
    *C22C 38/04*     (2006.01)
    *C22C 38/12*     (2006.01)
    *C22C 38/14*     (2006.01)

(52) U.S. Cl.
    CPC ......... *C21D 8/0226* (2013.01); *C21D 8/0236* (2013.01); *C21D 8/0263* (2013.01); *C22C 38/04* (2013.01); *C22C 38/12* (2013.01); *C22C 38/14* (2013.01); *C21D 2211/005* (2013.01); *C21D 2211/008* (2013.01)

(58) Field of Classification Search
    CPC ............ C21D 8/0263; C21D 2211/005; C21D 2211/008; B21D 22/022; C22C 38/04; C22C 38/12; C22C 38/14
    See application file for complete search history.

(56) References Cited

FOREIGN PATENT DOCUMENTS

| | | | | |
|---|---|---|---|---|
| KR | 20140141218 A | * | 12/2014 | ............ C22C 38/00 |
| KR | 10-2016-0042968 A | | 4/2016 | |
| KR | 10-2016-0061560 A | | 6/2016 | |
| KR | 10-2016-0078563 A | | 7/2016 | |
| KR | 10-2016-0079467 A | | 7/2016 | |
| KR | 10-2016-0114019 A | | 10/2016 | |
| KR | 10-2017-0035468 A | | 3/2017 | |

* cited by examiner

STEEL MATERIAL FOR TAYLOR WELDED BLANK AND METHOD FOR MANUFACTURING HOT-STAMPED PART USING SAME STEEL

CROSS-REFERENCE TO RELATED APPLICATIONS

This application is a National Phase application filed under 35 USC 371 of PCT International Application No. PCT/KR2017/015716 with an International Filing Date of Dec. 29, 2017, which claims under 35 USC 119(a) the benefit of Korean Application No. 10-2017-0081280, filed Jun. 27, 2017, and Korean Application No. 10-2017-0168403, filed Dec. 8, 2017, the entire contents of which are incorporated herein.

TECHNICAL FIELD

The present disclosure relates to a steel material for a tailor-welded blank and a method of manufacturing a hot-stamped part using the same, and more particularly, to a steel material for a tailor-welded blank, which has improved elongation and performance as an shock absorbing material while minimizing the variation in properties thereof, which depends on hot-stamping process parameters, and a method of manufacturing a hot-stamped part using the same.

BACKGROUND ART

In recent years, the automobile industry has demanded strict automotive crash performance to enhance passenger safety. In addition, as the awareness of the environment has raised, the fuel economy standards for exhaust gas regulations have been strengthened, and thus the need for automobile body weight reduction has continuously increased. As part of efforts to simultaneously satisfy the demands of improving the crash performance and reducing the automobile body weight, the application of high-strength steel plates to automobile bodies has continuously increased. In manufacturing the automobile body, high-strength parts are applied to reinforce protection against side crashes, because they play a very important role in securing a survival space for the driver when a side crash occurs. High-strength steel material corresponding to a class of 150K, which is mainly used as an automobile crash energy absorbing member, undergoes brittle fracture which threatens the safety of the driver when a side crash occurs. For this reason, another member is connected to the lower end of the high-strength steel material, which undergoes brittle fracture, by a tailor-welded blank (TWB) process, thereby increasing the crash energy absorption ability of the high-strength steel material.

The prior arts related to the present disclosure include Korean Patent Application Laid-Open Publication No. 2016-0061560 (published on Jun. 1, 2016; entitled "Method for Manufacturing Taylor Welded Blank").

SUMMARY OF THE INVENTION

Technical Problem

A problem to be solved by the present disclosure is to provide a hot-stamped steel material, which may have improved elongation and crash performance while minimizing the variation in properties thereof by controlling alloying elements and process conditions, and a method of manufacturing a hot-stamped part using the same.

Technical Solution

In accordance with one aspect of the present disclosure, provided is a steel material for a tailor-welded blank, including 0.04 to 0.06 wt % of carbon (C), 1.2 to 1.5 wt % of manganese (Mn), 0.01 to 0.10 wt % of titanium (Ti), 0.01 to 0.10 wt % of niobium (Nb), and the balance of iron (Fe) and inevitable impurities.

In the present disclosure, the steel material for a tailor-welded bank may be a steel material having a tensile strength (TS) of 550 MPa or greater, a yield strength (YS) of 300 MPa or greater and an elongation (EL) of 20% or greater, and having a dual-phase structure of ferrite and martensite.

In the present disclosure, the steel material for a tailor-welded blank may further include more than 0 wt % and not more than 0.03 wt % of silicon (Si), more than 0 wt % and not more than 0.018 wt % of phosphorus (P), and more than 0 wt % and not more than 0.003 wt % of sulfur (S).

In the present disclosure, the steel material for a tailor-welded blank may further include an aluminum (Al)-silicon (Si) plating layer for improving corrosion resistance on the surface of the steel material.

In accordance with another aspect of the present disclosure, provided is a method for manufacturing a hot-stamped part, including the steps of: preparing a first blank using a steel slab including 0.04 to 0.06 wt % of carbon (C), 1.2 to 1.5 wt % of manganese (Mn), 0.01 to 0.10 wt % of titanium (Ti), 0.01 to 0.10 wt % of niobium (Nb), and the balance of iron (Fe) and inevitable impurities, and a second blank obtained by cutting a steel plate provided separately from the first blank; forming a joined steel plate by welding the first and second blanks to each other by a tailor-welded blank process; forming a molded body by hot-stamping the joined steel material in a press mold; and forming a hot-stamped part by cooling the molded body.

In the present disclosure, the step of preparing the first blank may include the steps of: finish-hot-rolling the steel slab at a finishing delivery temperature (FDT) of 860° C. to 920° C.; cooling the finish-hot-rolled steel plate to a coiling temperature (CT) of 620° C. to 660° C., followed by coiling; uncoiling the coiled steel plate, followed by cold rolling; and subjecting the cold-rolled steel plate to annealing heat treatment.

In the present disclosure, the second blank may be formed into a steel plate having a tensile strength of 1,200 to 1,500 MPa.

In the present disclosure, the step of forming the molded body may include the steps of: heating the joined steel plate at a temperature of 850° C. to 950° C.; and transferring the heated joined steel plate to the press mold within a transfer time of 9 to 11 seconds.

In the present disclosure, the cooling of the molded body in the step of forming the hot-stamped part may be performed at a rate of 30 to 120° C./s.

In the present disclosure, the first blank may function as a shock absorbing element for an automotive B-pillar, and the second blank may function as a crash support element for the automotive B-pillar.

In the present disclosure, the first blank may have a tensile strength (TS) of 550 MPa or greater, a yield strength (YS) of 300 MPa or greater, and an elongation (EL) of 20% or greater, and have a dual-phase structure of ferrite and martensite, after the hot stamping.

In the present disclosure, the method may further include a step of plating the surface of the steel plate with aluminum (Al)-silicon (Al) for improving corrosion resistance.

Advantageous Effects

According to the present disclosure, it is possible to minimize the variation in properties of the steel material in the hot-stamping process, increase the strength and toughness of the steel material by reducing the martensite packet size, and increase the elongation of the steel material.

Therefore, the hot-stamped part manufactured by the method according to the present disclosure exhibits a tensile strength (TS) of 559 to 605 MPa, a yield strength (YP) of 360 to 461 MPa, and elongation (EL) of 28.5 to 32.7%, is easily processed into a complex shape, and is also suitable for use as a shock absorbing element for an automobile crash energy absorbing member due to its excellent crash absorption performance.

DETAILED DESCRIPTION

Mode for Disclosure

Figure 1:
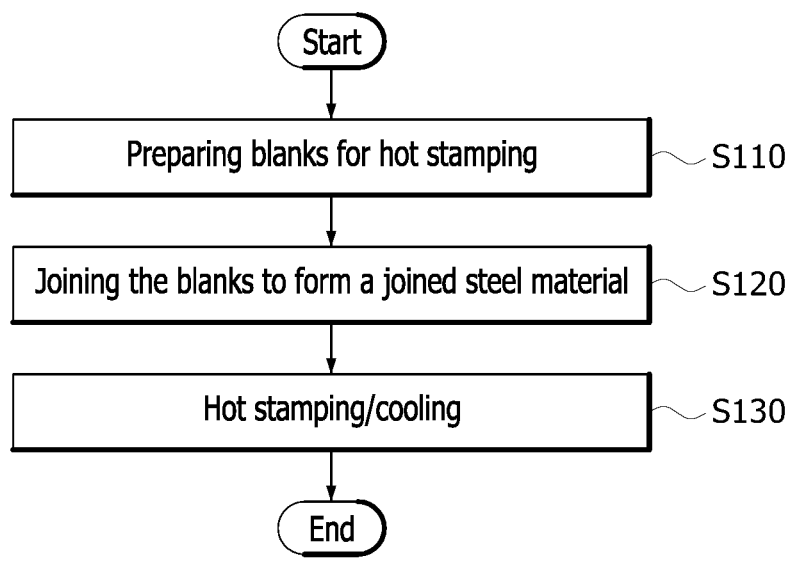
FIG. 1 is a process flowchart showing a method for manufacturing a hot-stamped part according to an embodiment of the present disclosure.

Hereinafter, the present disclosure will be described in detail with reference to the accompanying drawings so that those skilled in the art may easily carry out the present disclosure. The present disclosure may be embodied in various different forms and is not limited to the embodiments described in the present specification. Like reference numerals designate like or similar components throughout the present specification. In addition, detailed description of known functions and configurations that may unnecessarily obscure the subject matter of the present disclosure will be omitted.

A B-pillar, an important component for an automobile crash energy absorbing member, has a structure in which steel materials having different strengths are connected to an upper crash support element and a lower shock absorbing element, respectively, and is manufactured by welding the two steel materials to each other, followed by molding. The TWB method, which is mainly used in this manufacturing process, refers to a series of processes of manufacturing a part by cutting two steel plates having different thicknesses, strengths and properties into a required shape, and welding the cut steel plates, followed by press molding. The TWB method is capable of welding two steel materials having different thicknesses to each other so that each part may have a required property. The crash support element at the upper portion of the B-pillar is made of, for example, an ultrahigh-strength steel material corresponding to a class of 120 to 150K, and a member having good shock absorption performance is connected, by the TWB method, to the lower end of the B-pillar, on which stress is concentrated, thereby improving the ability of the B-pillar to absorb shock when an automobile crash occurs. The steel material that is used in the impact absorption element of the B-pillar is generally referred to as a steel for TWB.

Currently, a steel for TWB is being developed as steel having a 70K class tensile strength together with a final ferrite-martensite dual phase through a hot-stamping process after hot-rolling and cold-rolling processes. In order to form the B-pillar, the 70K class steel for TWB and, for example, a 150K class steel are welded to each other by the TWB method, and then hot-stamped.

However, the existing 150K class steel does not undergo changes in properties thereof during the hot-stamping process, because it obtains a 100% martensite structure through the hot-stamping process. However, the 70K class steel for TWB has a disadvantage in that the properties thereof change rapidly depending on various parameters of the hot-stamping process, for example, the transfer time taken for the steel to be transferred to a hot-stamping mold after heating the steel, or the cooling rate of the blank or the mold. Accordingly, when the 70K class steel for TWB is welded with the 150K class steel to form a joined steel material and hot stamping is performed on the joined steel material, it is very difficult to control the process parameters, and hence the variation in properties of the hot-stamped part occurs, and thus the hot-stamped part is not suitable for an automobile crash energy absorbing member. In order to overcome this problem, in the present disclosure, the variation in properties of the steel material is minimized within the range of hot-stamping process parameters through the control and precipitation of the components of the steel material.

Steel Material for TWB

One aspect of the present disclosure relates to a steel material for TWB that undergoes a hot stamping process. In one embodiment, the steel material for TWB according to one aspect of the present disclosure includes 0.04 to 0.06 wt % of carbon (C), more than 0 wt % and not more than 0.03 wt % of silicon (Si), 1.2 to 1.5 wt % of manganese (Mn), more than 0 wt % and not more than 0.018 wt % of phosphorus (P), more than 0 wt % and not more than 0.003 wt % of sulfur (S), 0.01 to 0.10 wt % of titanium (Ti), 0.01 to 0.10 wt % of niobium (Nb), and the balance of iron (Fe) and inevitable impurities.

The steel material for TWB finally has a tensile strength (TS) of 559 to 605 MPa, a yield strength (YS) of 360 to 390 MPa, and an elongation (EL) of 20% or greater, and has a dual-phase structure of ferrite and martensite, after hot stamping.

In addition, the steel material for TWB may further contain an aluminum (Al)-silicon (Si) plating layer for improving corrosion resistance on the surface thereof.

The steel material for TWB according to the present disclosure may reliably exhibit a 55K class tensile strength after being subjected to hot stamping in a state in which it is joined with a 150K class steel material.

Thus, the steel material for TWB may have a greater shock absorption rate than a conventional 70K class steel material in a part state in which it is joined with a 150K class steel material.

Hereinafter, the functions and contents of the components contained in the steel material for TWB according to the present disclosure will be described.

Carbon (C)

Carbon (C) is a major element that determines the strength and hardness of the steel material, and is included to ensure the tensile strength of the steel material after the hot-stamping (hot-pressing) process. In one embodiment, carbon (C) is preferably contained in an amount of 0.04 to 0.06 wt % based on the total weight of the steel material for TWB. When carbon (C) is contained in an amount of less than 0.04 wt %, it may be difficult to achieve the mechanical strength of the present disclosure, and when carbon (C) is contained in an amount of more than 0.06 wt %, the toughness of the steel material may be reduced.

Manganese (Mn)

Manganese (Mn) is included for the purpose of increasing hardenability and strength during heat treatment. Manganese (Mn) is preferably contained in an amount of 1.2 to 1.5 wt % based on the total weight of the steel material for TWB according to the present disclosure. When the content of manganese (Mn) is less than 1.2 wt %, the effect of refining grains is insufficient. On the other hand, when the content of manganese (Mn) is more than 1.5 wt %, a problem arises in that the toughness of the steel is degraded due to the occurrence of central segregation and this content is disadvantageous in terms of the production cost.

Titanium (Ti)

Titanium (Ti) is included for the purpose of increasing strength and toughness by reducing the martensite packet size. In addition, titanium (Ti) contributes to improving the elongation of the steel by stably ensuring a ferrite region. Titanium (Ti) is preferably contained in an amount of 0.01 to 0.10 wt % based on the total weight of the steel material for TWB according to the present disclosure. When the content of titanium (Ti) is less than 0.01 wt %, the effect of refining grains is insufficient. On the other hand, when the content of titanium (Ti) is more than 0.10 wt %, it may result in a decrease in toughness.

Niobium (Nb)

Niobium (Nb) is contained for the purpose of increasing strength and toughness by reducing the martensite packet size. In addition, niobium (Nb) contributes to improving the elongation of the steel material by stably ensuring a ferrite region. In one embodiment, niobium (Nb) is contained in an amount of 0.01 to 0.10 wt % based on the total weight of the steel material for TWB according to the present disclosure. When niobium (Nb) is contained in an amount of less than 0.01 wt %, the effect of refining grains of the steel material in the hot-rolling and cold-rolling processes may be insignificant, and when niobium (Nb) is contained in an amount of more than 0.10 wt %, it may form coarse precipitates in the steel making process and degrade the elongation of the steel material, and may be disadvantageous in terms of the production cost.

Silicon (Si)

Silicon (Si) contributes to improving the strength and elongation of the steel material. However, when silicon (Si) is contained in an amount of more than 0.03 wt % based on the total weight of the steel material for hot stamping according to the present disclosure, it may cause surface defects and degrade the plating property of the steel material. Thus, in the present disclosure, silicon (Si) is preferably contained in an amount of more than 0 wt % and not more than 0.03 wt % based on the total weight of the steel material for hot stamping.

Phosphorus (P)

Phosphorus (P) is an element that is easily segregated and degrades the toughness of the steel material. In one embodiment, phosphorus (P) is preferably contained in an amount of more than 0 wt % and not more than 0.018 wt % based on the total weight of the steel material for hot stamping according to the present disclosure. When phosphorus is contained in an amount within the above-described range, toughness may be prevented from being degraded. When phosphorus (P) is contained in an amount of more than 0.018 wt %, it may cause cracks during the process and form an iron phosphide compound, thus degrading the toughness of the steel material.

Sulfur (S)

Sulfur (S) is an element that degrades workability and physical properties. In one embodiment, sulfur (S) may be contained in an amount of more than 0 wt % and not more than 0.003 wt % based on the total weight of the steel material for hot stamping according to the present disclosure. When sulfur (S) is contained in an amount of more than 0.003 wt %, it may degrade hot-rolling workability and cause surface defects such as cracks by producing macro-inclusions.

Hereinafter, a method of manufacturing a hot-stamped part using the steel material for TWB according to the present disclosure will be described in detail.

Method for Manufacturing Hot-Stamped Part

Figure 2:
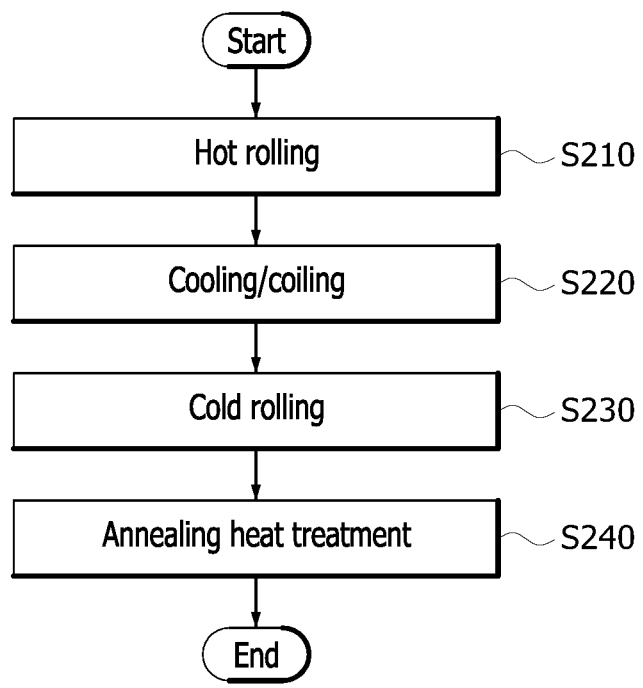
FIG. 2 is a process flowchart showing a step of preparing a blank for hot stamping in the method for manufacturing a hot-stamped part according to the embodiment of the present disclosure shown in FIG. 1.

Another aspect of the present disclosure relates to a method of manufacturing a hot-stamped part using the steel material for TWB that undergoes the TWB process. FIG. 1 is a process flowchart showing the method of manufacturing a hot stamping part according to the present disclosure, and FIG. 2 is a flowchart specifically showing a step of preparing a blank for hot stamping, shown in FIG. 1.

Referring to FIG. 1, the method for manufacturing a hot-stamped part according to one embodiment of the present disclosure includes the steps of: (S110) preparing blanks for hot stamping that are composed of two different kinds of steel materials; (S120) joining the blanks for hot stamping to each other to form a joined steel material; (S130) performing hot stamping on the joined steel material to form a molded body; and (S140) cooling the molded body to form a hot-stamped part.

Step (S110) of Preparing Blanks for Hot Stamping

Step (S110) of preparing blanks for hot stamping is a step of cutting two different kinds of steel plates for forming a hot-stamped part into a desired shape according to the intended use, for example, respectively forming a first blank which is to be used as a shock absorbing element and a second blank which is to be used as a crash support element in order to form an automobile B-pillar.

The first blank is a portion that becomes a shock absorbing element for the B-pillar after hot stamping, and has a suitable strength to protect a driver upon an automobile crash, and also preferably has an elongation capable of protecting the driver by absorbing shock when an automobile crash occurs. According to a preferred embodiment of the present disclosure, the first blank is composed of a steel material having a tensile strength (TS) of 559 to 605 MPa, a yield strength (YS) of 360 to 390 MPa and an elongation (EL) of 20% or greater, and having a dual-phase structure of ferrite and martensite, after hot stamping.

The second blank is a portion that becomes a crash support element for the B-pillar after hot stamping, and is composed of an ultrahigh-strength steel material having a tensile strength of 1,200 to 1,500 MPa after hot stamping, for example, in order to protect a driver by securing the survival space for the driver when an automobile crash occurs.

As shown in FIG. 2, the process of forming the first blank may include a hot-rolling step (S210), a cooling/coiling step (S220), a cold-rolling step (S230), and an annealing heat treatment step (S240).

In the method for manufacturing a hot-stamped part according to the present disclosure, the steel slab in a semi-finished product state, which is to be formed into the first blank in the process of forming the first blank, includes 0.04 to 0.06 wt % of carbon (C), more than 0 wt % and not more than 0.03 wt % of silicon (Si), 1.2 to 1.5 wt % of manganese (Mn), more than 0 wt % and not more than 0.018 wt % of phosphorus (P), more than 0 wt % and not more than 0.003 wt % of sulfur (S), 0.01 to 0.10 wt % of titanium (Ti), 0.01 to 0.10 wt % of niobium (Nb), and the balance of iron (Fe) and inevitable impurities.

In the steel slab reheating step, the steel slab obtained through a continuous casting process is reheated at a slab reheating temperature (SRT) of 1,200° C. to 1,250° C., whereby components segregated during the casting are re-dissolved into solid solution. If the slab reheating temperature (SRT) is lower than 1,200° C., a problem arises in that components segregated during the casting are not sufficiently re-dissolved into solid solution, making it difficult to achieve a significant effect of homogenizing the alloying elements. The slab reheating temperature (SRT) is more preferred for homogenization of the alloying elements as it is higher, but if the slab reheating temperature is higher than 1,250° C., the austenite grain size may increase, making it difficult to ensure strength, and baking hardenability and anti-aging properties may also decrease, and the product cost of the steel plate may merely increase due to an excessive heating process.

In the hot-rolling step (S210), the reheated steel slab is finish-hot-rolled at a finishing delivery temperature (FDT) of 860 to 920° C.

When the finishing delivery temperature (FDT) is excessively low (e.g., lower than 860° C.), problems arise in that the mixed grain structure by dual-phase region rolling occurs, making it difficult to ensure the workability of the steel plate, and the workability is reduced due to the non-uniformity of microstructures. In addition, a rapid phase change causes the problem of mass flow in hot rolling. The finishing delivery temperature (FDT) is also favorable for homogenization of the alloying elements as it is higher, like the SRT, and is determined depending on the SRT and the number of passes. However, when the finishing delivery temperature (FDT) is higher than 920° C., austenite grains are coarsened, resulting in decreases in baking hardenability and anti-aging properties.

In the cooling/coiling step (S220), the hot-rolled plate is cooled to a coiling temperature (CT) of 620 to 660° C. and coiled. The coiling temperature affects the re-distribution of carbon (C), and when the coiling temperature is lower than 620° C., strength is advantageously ensured, but a problem arises in that ductility decreases rapidly. On the other hand, when the coiling temperature is higher than 660° C., problems arise in that deterioration in formability or strength occurs due to abnormal grain growth or excessive grain growth.

In the cold-rolling step (S230), the coiled steel plate is uncoiled, pickled, and then cold-rolled. At this time, the pickling is performed for the purpose of removing scales from the coiled plate, that is, the hot-rolled coil produced through the hot-rolling process.

The cold rolling is preferably performed by cold-rolling the pickled plate at a cold-rolling reduction ratio of 60 to 80%. When the cold-rolling reduction ratio is less than 60%, the effect of deforming the hot-rolled structure is insignificant. On the other hand, when the cold-rolling reduction ratio is more than 80%, problems may arise in that the cost required for cold rolling increases, the drawability of the steel plate decreases, and cracks occur on the edge of the steel plate, resulting in fracture of the steel plate.

The annealing heat treatment step (S240) is a step of subjecting the cold-rolled steel plate material to annealing heat treatment. In one embodiment, the annealing heat treatment step includes a step of heating the cold-rolled steel plate and cooling the heated cold-rolled steel plate at a cooling rate of 20 to 50° C./s. In one embodiment, the cold-rolled steel plate may be heated at a temperature of 700 to 900° C. during the annealing heat treatment. When the cold-rolled steel plate is heated at a temperature within the above-described range, the process efficiency and the strength and formability of the steel material may all be excellent.

When the cold-rolled steel plate is cooled at a cooling rate of less than 20° C./s, the productivity of the steel material may be reduced, and when the cold-rolled steel plate is cooled at a cooling rate of more than 50° C./s, it may be difficult to ensure the uniform microstructure of the steel material. For example, the cold-rolled steel plate may be cooled at a cooling rate of 30 to 40° C./s.

Meanwhile, in the hot stamping step (S130) of FIG. 1, described below, the joined steel material, which is a molding target, is softened by heating at high temperature, and press-molded, followed by cooling. Thus, since the joined steel material is softened by heating at high temperature, it may be easily press-molded and the mechanical strength of the steel material is increased by quenching by cooling after the molding. However, since the steel material is heated at a high temperature of 800° C. or above, iron (Fe) on the surface of the steel material is oxidized to form oxides (scales). For this reason, in one embodiment of the present disclosure, a certain coating may be formed on the cold-rolled steel plate after the annealing heat treatment. Specifically, an aluminum (Al)-based metal coating, which has a higher melting point than an organic coating or a zinc (Zn)-based metal coating, is formed. For example, aluminum (Al)-silicon (Si)-based plating is performed. The cold-rolled steel plate plated with aluminum (A)-silicon (Si) is prevented from corrosion, and the formation of scales on the hot surface of the steel plate during transfer to the press mold is prevented.

Aluminum (Al)-silicon (Si) plating on the steel plate may be performed by a well-known method. One example is a method of coating the steel plate with aluminum (Al)-silicon (Si) by diffusion. In this method, the steel plate is placed in a heating furnace which may be heated to a diffusion/coating temperature, and then the surface of the steel plate heated to the diffusion/coating temperature is diffusion-coated with aluminum (Al)-silicon (Si). Another method of plating the steel plate with aluminum (Al)-silicon (Si) may be performed by immersing the steel plate in a plating bath, performing aluminum (Al)-silicon (Si) plating on the immersed steel plate, and then performing alloying heat treatment on the steel plate and cooling the alloying heat-treated steel plate.

Through this plating, an aluminum (Al)-silicon (Si) plating layer is formed on the surface of the steel plate. This plating layer may serve to prevent an oxide scale layer from being formed during a high-temperature heat treatment process to be described below.

Meanwhile, the second blank may be formed by performing a hot-rolling step, a cooling/coiling step, a cold rolling step and an annealing heat treatment step.

In the method for manufacturing a hot-stamped part according to the present disclosure, a steel slab in a semi-finished product state, which is to be formed into the second blank in the process of forming the second blank, may include, by wt %, 0.20 to 0.50% carbon (C), 0.05 to 1.00% silicon (Si), 0.10 to 2.50% manganese (Mn), more than 0% and not more than 0.015% phosphorus (P), more than 0% and not more than 0.005% sulfur (S), 0.05 to 1.00% chromium (Cr), 0.001 to 0.009% boron (B), 0.01 to 0.09% titanium (Ti), and the balance of iron (Fe) and inevitable impurities.

In one embodiment, the hot-rolling step may include the steps of: reheating the steel slab at a temperature of 1,200° C. to 1,250° C.; finish-rolling the reheated slab at a temperature of 900° C. to 950° C.; and cooling the hot-rolled steel plate to a temperature of 680° C. to 800° C., followed by coiling. Then, the cold-rolling step may include a step of pickling the coiled steel plate, followed by cold rolling. Next, the annealing heat treatment step may include a step of annealing the cold-rolled steel plate at a temperature of 740° C. to 820° C. The plate material subjected to the annealing heat treatment may be cooled to room temperature at a cooling rate of 5 to 50° C./sec, for example.

Step (S120) of Forming Joined Steel Material

The different kinds of first and second blanks are joined to each other by the TWB process to form a joined steel material. In one embodiment, the first and second blanks may be disposed in such a manner than the first blank becomes a shock absorbing element at the lower end of a B-pillar and the second blank becomes a crash support element at the upper portion thereof. Then, the first and second blanks may be welded to each other, for example, by a butt welding method using a laser.

Hot-Stamping Sep (S130)

The joined steel material is heated in a heating furnace at a temperature of about 850 to 950° C. For example, the heating may be performed at a temperature of 930° C. for about 5 minutes. Next, the heated joined steel material is transferred to a press mold. At this time, it may take a transfer time of about 9 to 11 seconds. After the joined steel material is molded into a final part shape in the press mold for hot stamping, the molded body is cooled rapidly at a cooling rate of about 30 to 120° C./sec to form a final product.

Although not shown in the drawing, the press mold may include therein a cooling channel through which a refrigerant circulates. Circulation of the refrigerant supplied through the cooling channel can quench the heated blank. At this time, in order to maintain the desired shape while preventing the joined steel material from springing back, quenching may be performed under pressure in a state in which the press mold is closed.

According to the hot-stamped part manufactured through the above-described processes (S110 to S130), it is possible to compensate for strength and secure elongation as a result of maximizing precipitation instead of reducing the fraction of martensite by limiting the content of carbon (C) contained in the steel material portion corresponding to the first blank, which is used in the shock absorbing element, to 0.04 to 0.06 wt %. In addition, as a result of property limiting the contents of titanium (Ti) and niobium (Nb), it is possible to reduce the martensite packet size, thus increasing the strength and toughness of the hot-stamped part. Moreover, by stably securing the ferrite region, it is possible to increase the elongation and minimize the variation in properties of the hot-stamped part, which depends on hot-stamping process parameters. In addition, even when expensive hardenable elements such as molybdenum (Mo) are not added, a superior 55K class hot-stamped part may be manufactured, which may exhibit shock absorption performance due to high elongation thereof.

Therefore, the hot-stamped part manufactured by the method according to the present disclosure includes, as a shock absorbing element, the steel material having a dual-phase structure of ferrite and martensite while satisfying a tensile strength (TS) of 550 MPa or greater, a yield strength (YP) of 300 MPa or greater and an elongation (EL) of 20% or greater, and thus is easily processed into a complex shape and also suitable for use as an automobile crash energy absorbing member due to excellent crash absorption performance thereof. In addition, the crash support element of the hot-stamped part may maintain a high tensile strength (TS) of 1200 to 1500 MPa.

Hereinafter, the configuration and effects of the present disclosure will be described in more detail with reference to preferred embodiments. However, these embodiments are presented as preferred examples of the present disclosure and cannot be construed as limiting the present disclosure in any way. In addition, contents that are not disclosed herein can be sufficiently and technically understood by any person skilled in the art, and thus the description thereof is omitted.

1st Embodiment

1. Preparation of Specimens

A steel slab containing the components shown in Table 1 below and the balance of iron (Fe) and other inevitable impurities was reheated at a slab reheating temperature of 1,200° C., hot-rolled at a finishing delivery temperature of 900° C., and then cooled and coiled at a coiling temperature of 640° C., thereby producing a hot-rolled coil. The hot-rolled coil was uncoiled, and then cold-rolled to produce a cold-rolled steel plate. The cold-rolled steel plate was subjected to annealing heat treatment by heating to a temperature of 810° C. and then cooling at a cooling rate of 33° C./s, thereby producing a steel material of Example 1.

In addition, steel materials of Comparative Examples 1 and 2 were produced in the same manner as Example 1 above, except that steel slabs containing the components shown in Table 1 and the balance of iron (Fe) and other inevitable impurities were applied. In the case of the steel material specimen of Comparative Example 2, titanium (Ti) and molybdenum (Mo) were added in amounts different from those of the steel material specimen of Comparative Example 1.

TABLE 1

| Classification | C (wt %) | Mn (wt %) | Nb (wt %) | Ti (wt %) | Mo (wt %) | Target tensile strength after hot stamping |
|---|---|---|---|---|---|---|
| Example 1 | 0.05 | 1.40 | 0.06 | 0.07 | — | 550 MPa or more |
| Comparative Example 1 | 0.08 | 1.60 | 0.05 | 0.07 | — | 500 to 700 MPa |

TABLE 1-continued

| Classification | C (wt %) | Mn (wt %) | Nb (wt %) | Ti (wt %) | Mo (wt %) | Target tensile strength after hot stamping |
|---|---|---|---|---|---|---|
| Comparative Example 2 | 0.08 | 1.80 | 0.05 | 0.065 | 0.20 | 650 to 750 MPa |

Next, first blanks composed of the steel materials of Example 1 and Comparative Examples 1 and 2 were prepared. In addition, a second blank composed of a steel material having a tensile strength of 1500 MPa was separately prepared. The second blank may include, by wt %, 0.20 to 0.50% carbon, 0.05 to 1.00% silicon (Si), 0.10 to 2.50% manganese (Mn), more than 0% and not more than 0.015% phosphorus (P), more than 0% and not more than 0.005% sulfur (S), 0.05 to 1.00% chromium (Cr), 0.001 to 0.009% boron (B), 0.01 to 0.09% titanium (Ti), and the balance of iron (Fe) and inevitable impurities.

Each of the first blanks was laser-welded to the second blank, thereby producing joined steel materials according to Example 1 and Comparative Examples 1 and 2. Each of the joined steel materials was heated at a temperature of 930° C. for 5 minutes, and then each of the heated joined steel materials was transferred to a hot press mold within a transfer time of about 10 seconds and hot-press-molded to produce molded bodies. Each of the molded bodies was cooled at a cooling rate of 100° C./s, thereby manufacturing final hot-stamped parts.

2. Evaluation of Mechanical Properties

Of the produced molded bodies, tensile strength (MPa), yield strength (MPa) and elongation (%) were measured for the steel material portion corresponding to each of Example 1 and Comparative Examples 1 and 2. The results are shown in Table 2 below.

TABLE 2

| Classification | Tensile strength (TS) (MPa) | Yield strength (YS) (MPa) | Elongation (EL) (%) |
|---|---|---|---|
| Target value | 550 MPa or more | 300 MPa or more | 20% or more |
| Example 1 | 580 | 370 | 26.0 |
| Comparative Example 1 | 570 | 390 | 13.2 |
| Comparative Example 2 | 730 | 530 | 12.3 |

Referring to the results in Table 2 above, the steel material portion of Example 1 exhibited better elongation than the steel materials of Comparative Examples 1 and 2 within the ranges of tensile strength and yield strength required for a crash absorbing material. In particular, in the case of elongation, the steel material of the Example of the present disclosure exhibited an elongation of 20% or more, suggesting that it has an excellent ability to absorb shock when an automobile crash occurs, and thus has excellent performance as a shock absorbing material.

Figure 3:
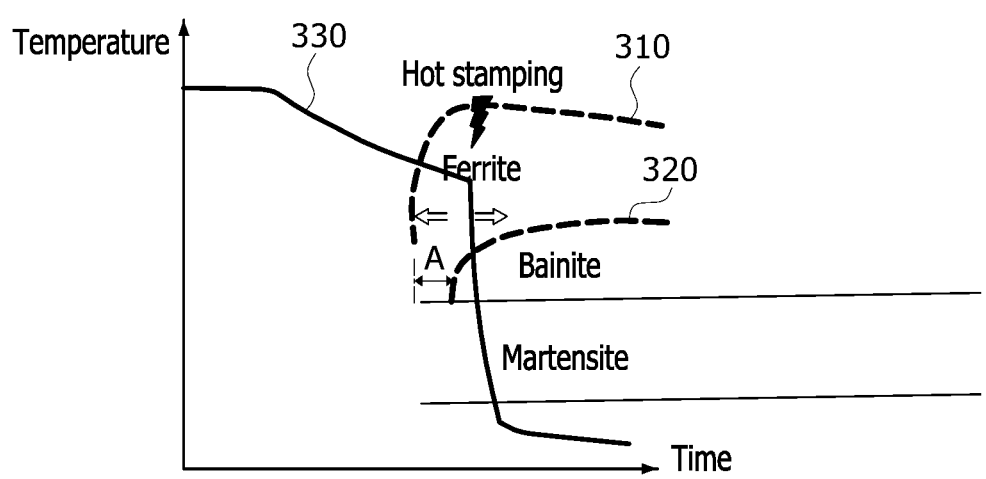
FIG. 3 shows process time-dependent changes in the microstructures of a hot-stamped part of a comparative example.
Figure 4:
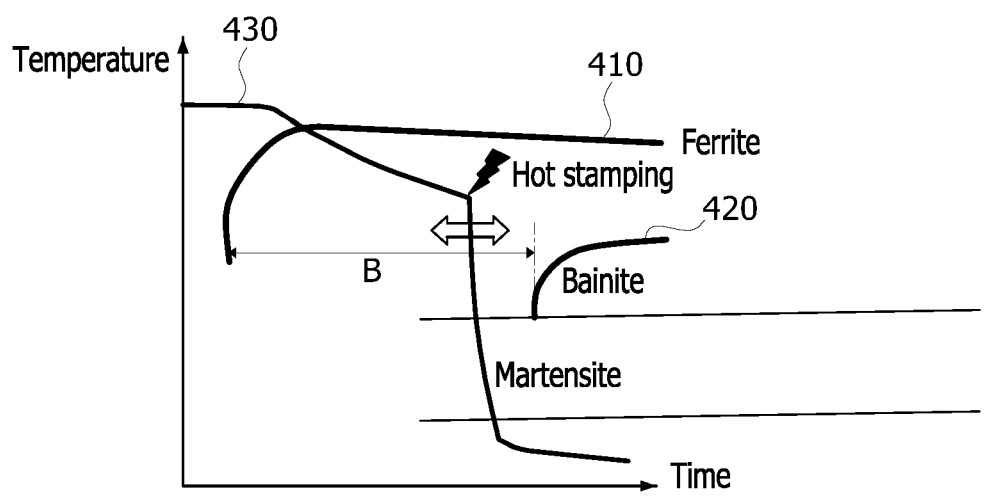
FIG. 4 shows process time-dependent changes in the microstructure of a hot-stamped part of an example.

FIG. 3 is a graph showing process time-dependent changes in the microstructures of the molded bodies corresponding to the steel materials of Comparative Examples 1 and 2, and FIG. 4 is a graph showing process time-dependent changes in the microstructure of the molded body corresponding to the steel material of Example 1.

During the production of the molded bodies of Example 1 and Comparative Examples 1 and 2, in order to examine transfer time-dependent changes in the microstructures of the steel materials when transferring the joined steel materials to the hot press, measurement was performed at transfer times of 7 sec, 9 sec, 11 sec and 13 sec. Table 3 below shows the distribution ranges of tensile strength, yield strength and elongation within the transfer time range.

TABLE 3

| Classification | Tensile strength (TS) (MPa) | Yield strength (YS) (MPa) | Elongation (EL) (%) |
|---|---|---|---|
| Example 1 | 559 to 605 | 360 to 390 | 26.0 to 32.7 |
| Comparative Example 1 | 529 to 619 | 354 to 435 | 7.0 to 19.4 |
| Comparative Example 2 | 685 to 773 | 466 to 601 | 8.5 to 16.1 |

Referring to Table 3 above, it can be seen that the variations in tensile strength, yield strength and elongation within the transfer time range were greater in the steel materials of Comparative Examples 1 and 2 than in Example 1.

Referring to FIG. 3, it can be seen that the steel materials of Comparative Examples 1 and 2 underwent rapid changes in the fractions of martensite and ferrite depending on the transfer time or the blank or mold cooling rate after heating for hot stamping. That is, as shown in FIG. 3, it can be seen that the time-axis spacing (reference numeral "A") between a ferrite transformation curve 320 and a bainite transformation curve 320 of the steel material is narrow, suggesting that the properties of the steel material can change rapidly as a temperature curve 330 of the steel material moves left or right on the time-axis depending on the process parameters. Since it is not easy to control the process conditions of the hot-stamping process, it can be seen that when the fractional variation in microstructural phases between different portions of the molded body occurs as described above, the molded body is not suitable for use as an automobile crash energy absorbing member.

On the contrary, referring to FIG. 4, it can be seen that a ferrite transformation curve 410 of the steel material was significantly shifted left on the time-axis compared to that in FIG. 3. Thus, the spacing (reference number "B") along the time-axis between the ferrite transformation curve 410 and a bainite transformation curve 420 is wide, and hence even when a time-dependent temperature curve 430 of the steel material is shifted left or right due to process parameters, it shifts between the two transformation curves 410 and 420, and thus the variation in properties of the hot-stamped part can be minimized. That is, the structure of the steel material of Example 1 after hot stamping may be a dual-phase structure of ferrite and martensite. This results from limiting the content of carbon (C) and controlling the contents of niobium (Nb) and titanium (Ti), which makes it possible to stably ensure the desired properties of the hot-stamped part.

Figure 5:
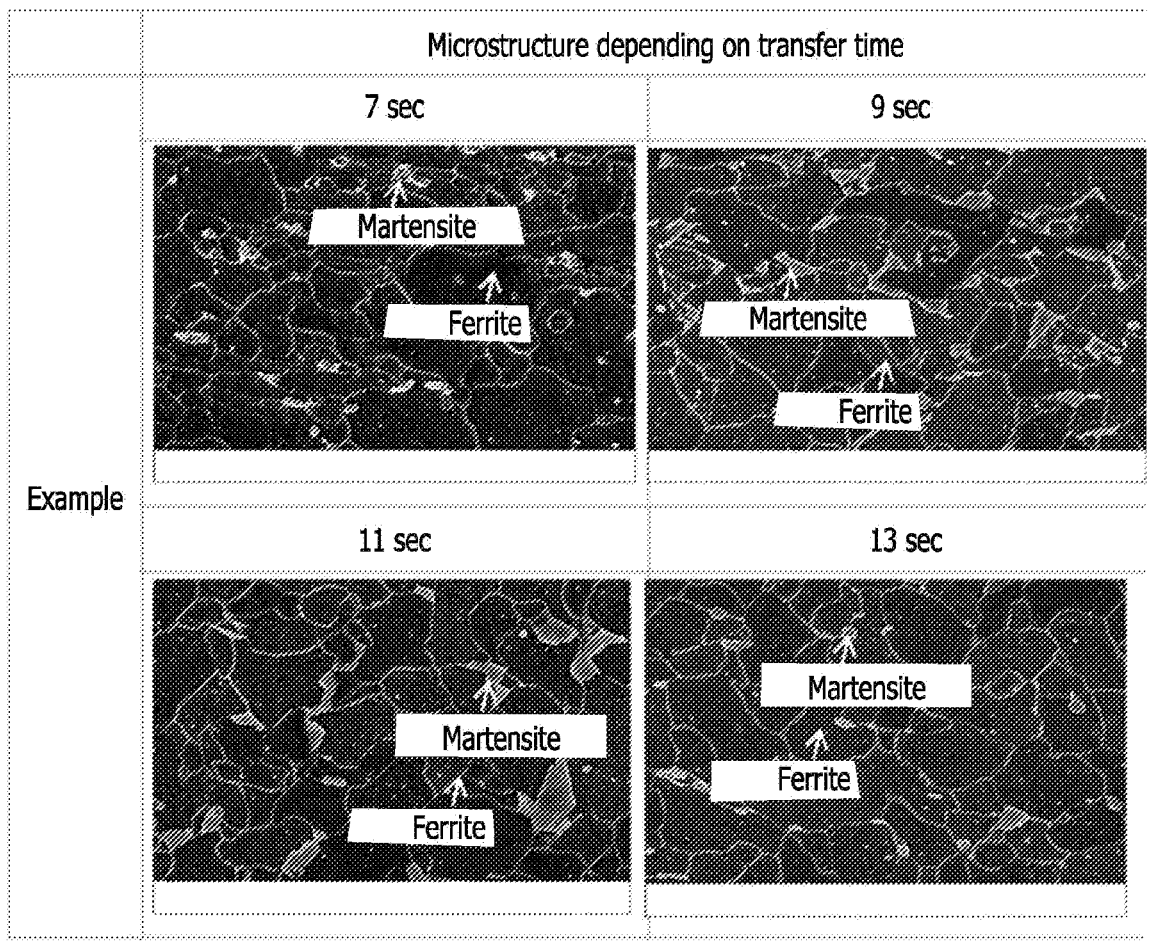
FIGS. 5 to 7 show the surface structures of an example of the present disclosure and comparative examples depending on the time of transferring to a hot-stamping mold.
Figure 6:
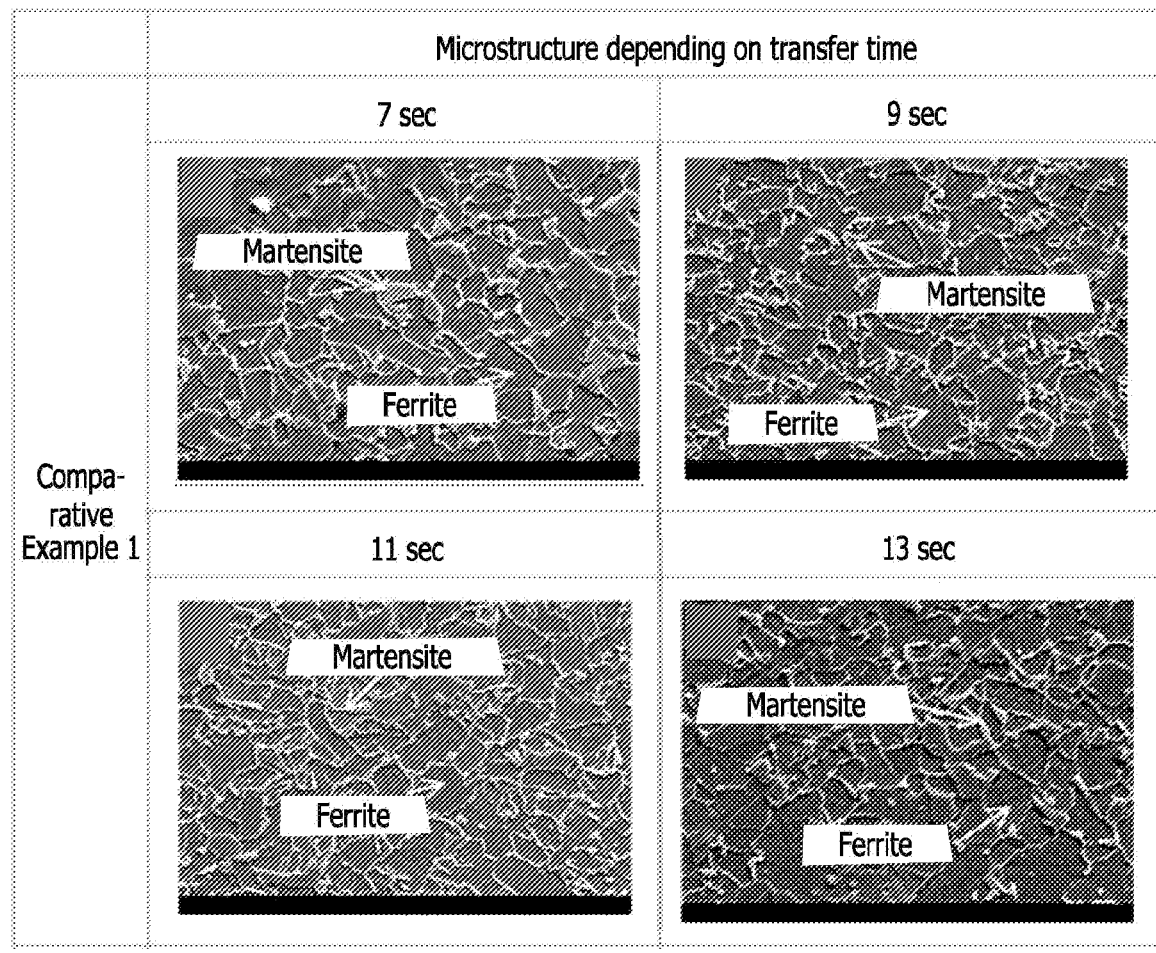

FIG. 5 shows the surface structure of the molded body corresponding to the steel material of Example 1 of the present disclosure depending on the time of transfer to the hot-stamping mold; FIG. 6 shows the surface structure of the molded body corresponding to the steel material of Comparative Example 1 depending on the time of transfer to the hot-stamping mold; and FIG. 6 shows the surface structure of the molded body corresponding to the steel material of Comparative Example 2 depending on the time of transfer to the hot-stamping mold.

Figure 7:
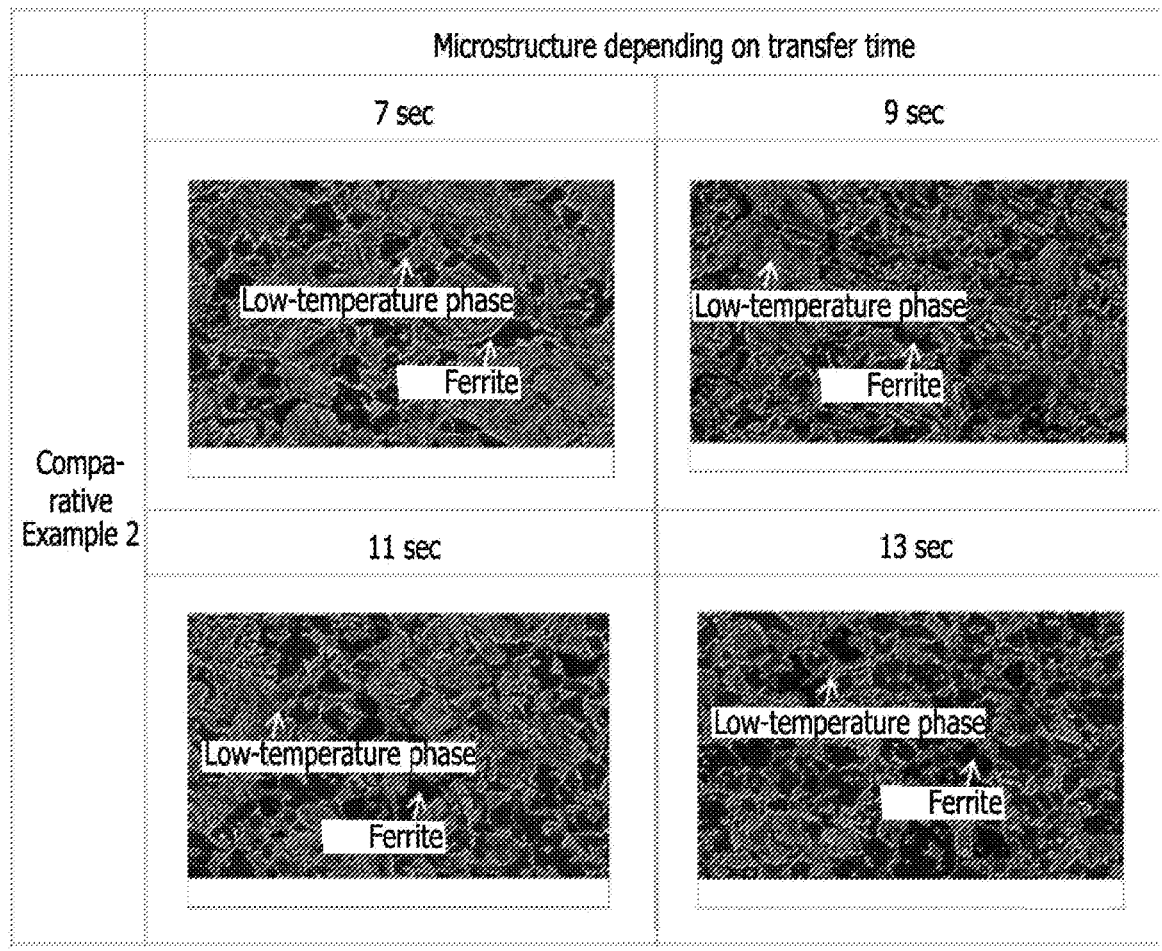

Referring to FIGS. 5 to 7, the steel material of Example 1 of the present disclosure had ferrite and martensite microstructures, and as shown in Table 3, showed a relatively small variation in tensile strength, yield strength and elongation properties within the time range of transfer to the mold. However, it was observed that within the time range of transfer to the mold, Comparative Example 1 did not ensure relatively stable ferrite and martensite microstructures, and Comparative Example 2 did not ensure relatively stable ferrite and low-temperature phase microstructures. The low-temperature phase was observed as a microstructure of martensite and bainite. In addition, it could be seen that Comparative Examples 1 and 2 showed a great variation in tensile strength, yield strength and elongation properties depending on the time range of transfer to the mold as compared to the steel material of Example 1, as shown in Table 3 above.

Figure 8:
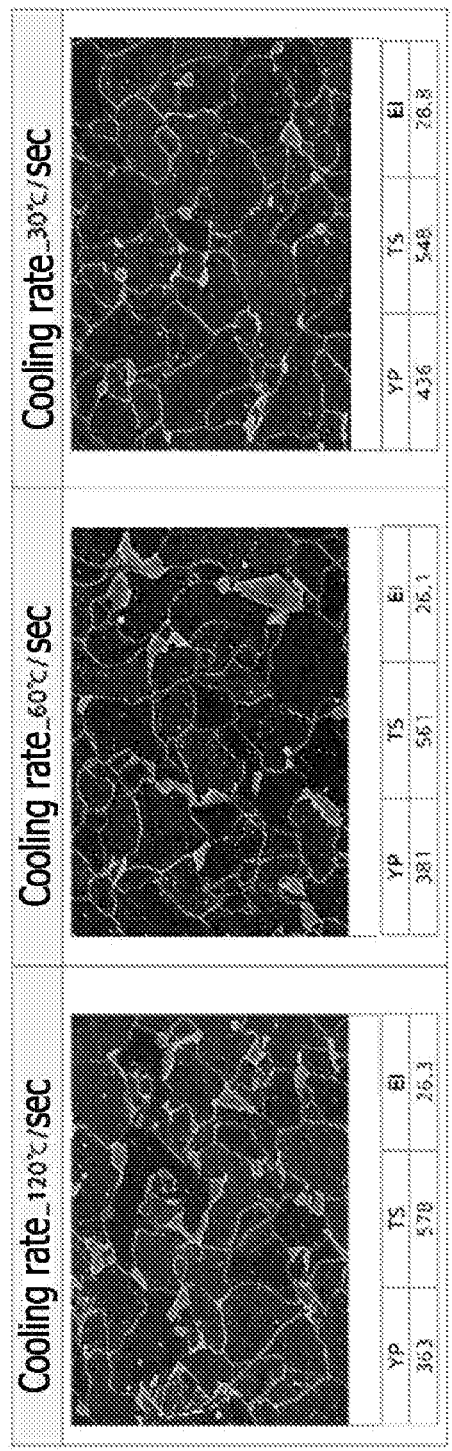
FIG. 8 shows the surface structure of an example of the present disclosure depending on the cooling rate of a hot-stamping mold.

FIG. 8 shows the surface structure of the molded body corresponding to the steel material of Example 1 of the present disclosure depending on the cooling rate of the hot-stamping mold. Specifically, FIG. 8 shows the surface structures at cooling rates of 30° C./s, 60° C./s and 120° C./s, respectively. As shown in FIG. 8, the fractions of microstructures depending on the cooling rate were almost constant, and the variations in tensile strength, yield strength and elongation depending on the cooling rate were also not great.

Taken the above results together, it can be seen that when titanium (Ti) and niobium (Nb) are added to ensure a ferrite region and increase hardenability in order to prevent the variation in properties of the molded body, which occurs depending on process parameters, such as the time of transfer to the mold and the cooling rate, which are difficult to control, and when the fraction of martensite is reduced by reducing the amount of carbon (C) added, the steel material according to the Example of the present disclosure can stably ensure microstructures within the range of the hot-stamping process parameters (the time of transfer to the hot press mold and the cooling rate), and thus can minimize the variation in properties between different portions of the molded body. In addition, it can be seen that even when expensive molybdenum (Mo) is added, the steel material of the Example of the present disclosure has better toughness than the steel materials of the Comparative Examples, and thus has excellent economic efficiency.

$2^{nd}$ Embodiment

1. Preparation of Specimens

A steel material of an Example, which has the alloy composition of Example 1 shown in Table 1 of the $1^{st}$ embodiment, was prepared by sequentially performing the hot rolling, cold rolling and annealing heat treatment processes as described in the $1^{st}$ embodiment. In addition, steel materials of a plurality of Comparative Examples, which have an alloy composition including more than 0 wt % and not more than 0.0020 wt % of boron added to the alloy composition of Example 1 shown in Table 1 of the $1^{st}$ embodiment, were prepared by performing the processes described in the $1^{st}$ embodiment under the same process conditions.

Each of blanks, composed of the steel materials of the Example and the plurality of Comparative Examples, was laser-welded to a bank composed of a 150K class steel material, thereby producing joined steel materials according to the Example and the plurality of Comparative Examples, respectively. On the joined steel materials, the hot press process of the $1^{st}$ embodiment was performed, thereby manufacturing final hot-stamped parts.

2. Evaluation of Mechanical Properties

Of the produced molded bodies, the fraction of bainite produced in the steel material by addition of boron was measured for the steel material portion corresponding to each of the Example and the plurality of the Comparative Examples.

Figure 9:
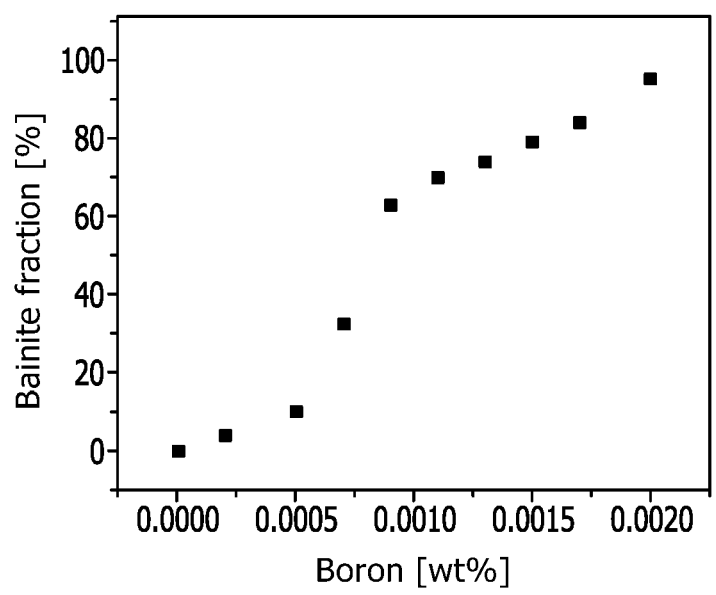
FIG. 9 shows the change in the structure of a steel material by addition of boron to the steel material according to one embodiment of the present disclosure.

FIG. 9 is a graph showing the change in structure by the addition of boron into the steel material according to one embodiment of the present disclosure. Referring to FIG. 9, in the steel material of the Example, to which no boron was added, no bainite was observed. However, in the steel materials of the plurality of Comparative Examples, the fraction of bainite tended to increase as the content of boron increased. That is, as shown in FIG. 3, it can be expected that as boron is added to the steel material, a section in which the temperature curve 330 of the steel material passes through the bainite transformation curve 320 will increase in the cooling process. However, as shown in FIG. 4, in the case of the steel material of the Example, the temperature curve 330 of the steel material may not meet the bainite transformation curve 320 in the cooling process. Thus, the fraction corresponding to the bainite structure produced in the steel materials of the plurality of Comparative Examples may be included in the fraction of the ferrite structure in the steel material of the Example. Therefore, the steel material of the Example may have better ductility than the steel materials of the plurality of Comparative Examples.

$3^{rd}$ Embodiment

1. Preparation of Specimens

A plurality of steel slabs, each including the components shown in Table 4 below and the balance of iron (Fe) and other inevitable impurities, were reheated at a slab reheating temperature of 1,200° C., hot-rolled at a finishing delivery temperature of 900° C., and then cooled and coiled at a coiling temperature of 640° C., thereby producing hot-rolled coils. The hot-rolled coils were uncoiled, and then cold-rolled, thereby producing cold-rolled steel plate materials. Next, the cold-rolled plate materials were subjected to annealing heat treatment by heating to a temperature of 810° C. and then cooling at a cooling rate of 33° C./s, thereby producing steel materials of Examples 2 to 5 and Comparative Examples 3 to 7.

TABLE 4

| Classification | C (wt %) | Mn (wt %) | Ti (wt %) | Nb (wt %) |
|---|---|---|---|---|
| Example 2 | 0.05 | 1.2 | 0.07 | 0.06 |
| Example 3 | | 1.3 | | |
| Example 4 | | 1.4 | | |
| Example 5 | | 1.5 | | |
| Comparative Example 3 | | 1.6 | | |
| Comparative Example 4 | | 1.7 | | |
| Comparative Example 5 | | 1.8 | | |
| Comparative Example 6 | | 1.9 | | |
| Comparative Example 7 | | 2.0 | | |

Then, each of blanks, composed of the steel plate materials of Examples 2 to 5 and Comparative Examples 3 to 7, was laser-welded to a blank composed of a 150K class steel material, thereby producing joined steel materials according to Examples 2 to 5 and Comparative Examples 3 to 7, respectively. Each of the joined steel materials was heated at a temperature of 930° C. for 5 minutes, and then each of the heated joined steel materials was transferred to a hot press mold within a transfer time of about 10 seconds and hot-press-molded, thereby producing molded bodies. The molded bodies were cooled at a cooling rate of 100° C./s, thereby manufacturing final hot-stamped parts.

2. Evaluation of Mechanical Properties

Of the produced molded bodies, the elongation depending on the amount of manganese added was measured for the steel material portion corresponding to each of Examples 2 to 5 and Comparative Examples 3 to 7. For measurement of the elongation, 10 specimens for each of Examples 2 to 5 and Comparative Examples 3 to 7 were produced, and then measurement of the elongation was performed through a room-temperature tensile test.

Figure 10:
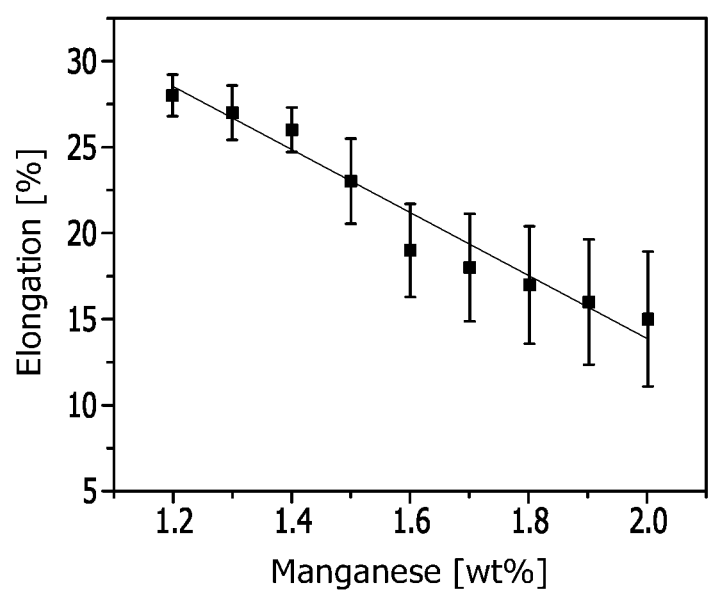
FIG. 10 is a graph showing the change in elongation in one example of the present disclosure and a comparative example as a function of the content of manganese.

FIG. 10 is a graph showing the changes in elongation of one Example of the present disclosure and one Comparative Example as a function of the content of manganese. Table 5 below shows the average elongation (%) and standard deviation of the 10 specimens produced for each of Examples 2 to 5 and Comparative Examples 3 to 7.

TABLE 5

| Classification | Average elongation (%) | Standard deviation |
| --- | --- | --- |
| Example 2 | 28 | 1.2 |
| Example 3 | 27 | 1.6 |
| Example 4 | 26 | 1.3 |
| Example 5 | 23 | 2.5 |
| Comparative Example 3 | 19 | 2.7 |
| Comparative Example 4 | 18 | 3.1 |
| Comparative Example 5 | 17 | 3.4 |
| Comparative Example 6 | 16 | 3.6 |
| Comparative Example 7 | 15 | 3.9 |

Referring to Table 5 above and FIG. 10, the steel materials of Examples 2 to 5 had better average elongation than the steel materials of Comparative Examples 3 to 7. In addition, the standard deviation of elongation of the steel materials of Examples 2 to 5 of the present disclosure is measured to be lower than those of the steel materials of Comparative Examples 3 to 7. That is, in the case of Comparative Examples 3 to 7, in which the content of manganese in the steel material was 1.6 wt % or more, it is easy to ensure the strength due to an increase in solid-solution enhancement caused by manganese, but there is a risk that the elongation will decrease and the standard deviation of the elongation will increase. In contrast, in the case of Examples 2 to 5, after hot stamping, the elongation increases while the standard deviation of the elongation relatively decreases, and thus the performance of the part can be stabilized.

4$^{th}$ Embodiment

1. Preparation of Specimens

A plurality of steel slabs, including the alloy compositions of Examples 2 to 5 in Table 4 above and the balance of iron (Fe) and other inevitable impurities, respectively, were reheated at a slab reheating temperature of 1,200° C., hot-rolled at a finishing delivery temperature of 900° C., and then cooled and coiled at a coiling temperature of 640° C., thereby producing hot-rolled coils. The hot-rolled coils were uncoiled, and then cold-rolled, thereby producing cold-rolled steel plates. The cold-rolled steel plate materials were subjected to annealing heat treatment by heating to a temperature of 810° C. and then cooling at a cooling rate of 33° C./s, thereby producing steel materials of Examples 2 to 5.

Then, each of blanks, composed of the steel materials of Examples 2 to 5, was laser-welded to a blank composed of a steel material having a tensile strength of 1500 MPa, thereby producing joined steel materials according to Examples 2 to 5. Each of the joined steel materials was heated at 930° C. for 5 minutes, and then each of the heated joined steel materials were transferred to a hot press mold within a transfer time of about 10 seconds and hot-press-molded, thereby producing molded bodies. The molded bodies were cooled at a cooling rate of 75° C./s, thereby manufacturing final hot-stamped parts.

2. Observation of Microstructures

For the molded bodies, the area fractions of microstructures in the steel material portions of Examples 2 to 5 were measured. The measurement was performed with a known ASTM E562-11 systematic manual point count method. The results of measurement of the area fractions are shown in Table 6 below.

TABLE 6

| | Manganese content (wt %) | Ferrite area fraction (%) | Martensite area fraction (%) |
| --- | --- | --- | --- |
| Example 2 | 1.2 | 88 to 98 | 2 to 12 |
| Example 3 | 1.3 | 87 to 97 | 3 to 13 |
| Example 4 | 1.4 | 88 to 97 | 3 to 12 |
| Example 5 | 1.5 | 87 to 98 | 2 to 12 |

Referring to Table 6 above, it was confirmed that the steel material portions of Examples 2 to 5 showed no great variation depending on the content of manganese. Within 1.2 to 1.5 wt %, which is the manganese content range of the present disclosure, the steel material portions of Examples 2 to 5 were observed to be composed of microstructures with ferrite having an area fraction of 87 to 98% and martensite having an area fraction of 2 to 13%.

5$^{th}$ Embodiment

1. Preparation of Specimens A plurality of steel slabs, each including 0.05 wt % of carbon, 1.4 wt % of manganese, 0.07 wt % of titanium, 0.06 wt % of niobium and the balance of iron (Fe) and other inevitable impurities, were reheated at a slab reheating temperature of 1,200° C., hot-rolled at a finishing delivery temperature of 900° C., and then cooled and coiled at a coiling temperature of 640° C., thereby producing hot-rolled coils. The hot-rolled coils were uncoiled, and then cold-rolled, thereby producing cold-rolled steel plates. Then, the cold-rolled steel plates were subjected to annealing heat treatment by heating to a temperature of 810° C. and then cooling at a cooling rate of 33° C./s, thereby producing steel materials.

Each of blanks, composed of the steel materials subjected to the annealing heat treatment, was laser-welded to a blank composed of a steel material having a tensile strength of 1500 MPa, thereby producing joined steel materials. The joined steel materials were heated at a temperature of 930° C. for 5 minutes, and then each of the heated joined steel materials was transferred to a hot press mold within a transfer time of about 10 seconds and hot-press-molded, thereby producing molded bodies. Then, the molded bodies were cooled at cooling rates of 34° C./s, 63° C./s, 94° C./s and 115° C./s, respectively, thereby manufacturing hot-stamped parts including the steel materials of Examples 6 to 9.

2. Observation of Microstructures

For the manufactured hot-stamped parts, the area fractions of microstructures in the steel material portions of Examples 6 to 9 were measured. The measurement was performed with a known ASTM E562-11 systematic manual point count method. The results of measurement of the area fractions are shown in Table 7 below.

TABLE 7

|  | Cooling rate (° C./s) | Ferrite area fraction (%) | Martensite area fraction (%) |
|---|---|---|---|
| Example 6 | 34 | 90 to 98 | 2 to 10 |
| Example 7 | 63 | 88 to 97 | 3 to 12 |
| Example 8 | 94 | 88 to 96 | 4 to 12 |
| Example 9 | 115 | 83 to 95 | 5 to 17 |

Referring to Table 7 above, it was confirmed that the steel material portions of Examples 6 to 9 showed no great variation depending on the cooling rate. Within the cooling rate range of 34 to 115° C./s, the steel material portions of Examples 6 to 9 were observed to be composed of microstructures with ferrite having an area fraction of 83 to 98% and martensite having an area fraction of 2 to 17%.

Although the present disclosure has been described in detail with reference to the embodiments, various modifications or alternations can be made by those skilled in the art. These modifications or alternations may be considered to fall within the present disclosure without departing from the scope of the present disclosure. Therefore, the scope of the present disclosure should be defined by the following claims.

The invention claimed is:

1. A steel material for a tailor-welded blank, comprising 0.04 to 0.06 wt % of carbon, 1.2 to 1.4 wt % of manganese, 0.07 to 0.10 wt % of titanium, 0.01 to 0.10 wt % of niobium, 0 wt % of molybdenum, and the balance of iron and inevitable impurities, and having a tensile strength of 550 MPa to 605 MPa, a yield strength of 300 MPa to 461 MPa, and an elongation of 20% to 32.7%, a standard deviation of average elongation of not more than 1.6 measured using 10 specimens of the steel material, and having a dual-phase structure of ferrite and martensite.

2. The steel material of claim 1, further comprising more than 0 wt % and not more than 0.03 wt % of silicon, more than 0 wt % and not more than 0.018 wt % of phosphorus, and more than 0 wt % and not more than 0.003 wt % of sulfur.

3. The steel material of claim 1, comprising an aluminum-silicon plating layer for improving corrosion resistance on a surface of the material.

* * * * *